United States Patent [19]

Totty

[11] Patent Number: 5,412,426
[45] Date of Patent: May 2, 1995

[54] MULTIPLEXING OF DIGITALLY ENCODED NTSC AND HDTV SIGNALS OVER SINGLE MICROWAVE COMMUNICATION LINK FROM TELEVISION STUDIO TO TOWER TRANSMITTER FACILITY FOR SIMULTANEOUS BROADCAST (SIMULCAST) TO CUSTOMER SITES BY TRANSMITTER FACILITY

[75] Inventor: Ronald E. Totty, Melbourne, Fla.

[73] Assignee: Harris Corporation, Melbourne, Fla.

[21] Appl. No.: 48,620

[22] Filed: Apr. 16, 1993

[51] Int. Cl.⁶ .............................................. H04N 7/12
[52] U.S. Cl. .................................. 348/385; 348/723
[58] Field of Search .................. 358/142, 141, 12, 11, 358/133; H04N 7/04, 7/08, 7/12, 7/13, 7/20, 5/38; 370/110.1, 110.4, 111, 112; 348/385, 723, 473, 423

[56] References Cited

U.S. PATENT DOCUMENTS

| | | | |
|---|---|---|---|
| 4,191,968 | 3/1980 | Kirk | 358/141 |
| 4,215,370 | 7/1980 | Kirk, Jr. | 358/146 |
| 4,318,126 | 3/1982 | Sassler | 358/141 |
| 4,589,110 | 5/1986 | Eng et al. | 370/118 |
| 4,593,318 | 6/1986 | Eng | 358/142 |
| 4,633,311 | 12/1986 | Gordon et al. | 358/133 |
| 4,689,661 | 8/1987 | Barbieri | 358/142 |
| 4,800,426 | 1/1989 | Glenn | 358/12 |
| 4,807,030 | 2/1989 | Sacks | 358/141 |
| 4,922,484 | 5/1990 | Yoshida et al. | 370/68.1 |
| 4,967,272 | 10/1990 | Kao et al. | 358/135 |
| 4,994,912 | 2/1991 | Lumelsky et al. | 358/140 |
| 4,994,913 | 2/1991 | Maeshima et al. | 358/142 |
| 5,027,398 | 6/1991 | Miyoshi | 380/4 |
| 5,027,400 | 6/1991 | Baji et al. | 380/20 |
| 5,027,401 | 6/1991 | Soltesz | 380/54 |
| 5,027,402 | 6/1991 | Richards, Jr. et al. | 381/10 |
| 5,055,927 | 10/1991 | Keesen et al. | 358/133 |
| 5,055,928 | 10/1991 | Klingelhofer et al. | 358/139 |
| 5,055,929 | 10/1991 | Sakai | 358/166 |
| 5,055,930 | 10/1991 | Nagasaki | 358/213.11 |
| 5,134,464 | 6/1992 | Basile | 358/12 |
| 5,202,755 | 4/1993 | Yang | 358/141 |
| 5,216,503 | 6/1993 | Paik | 358/133 |
| 5,231,494 | 7/1993 | Wachob | 348/385 |

FOREIGN PATENT DOCUMENTS

| | | | |
|---|---|---|---|
| 0145284 | 8/1983 | Japan | 358/133 |
| 76384 | 3/1990 | Japan | H04N 7/12 |
| 122782 | 5/1990 | Japan | H04N 7/08 |
| 4255189 | 9/1992 | Japan | H04N 7/08 |

Primary Examiner—James J. Groody
Assistant Examiner—Chris Grant
Attorney, Agent, or Firm—Charles E. Wands

[57] ABSTRACT

Simulcasting from a television transmitter facility of both NTSC video signals, via a UHF/VHF portion of the broadcast spectrum, and digital HDTV signals, over a prescribed UHF portion of the broadcast spectrum, is accomplished by converting the NTSC video signals into digital format at the television studio and multiplexing the digitally formatted NTSC signals and digital HDTV signals into a combined NTSC/HDTV digital television signal. The combined NTSC/HDTV digital television signal is transmitted over a common microwave radio frequency communication channel linking the television studio with the television transmitter facility. At the television transmitter facility, the combined NTSC/HDTV digital television signal is demultiplexed into separate HDTV and NTSC video digital signals. The digital NTSC video signals are converted into analog NTSC format, and the NTSC video signals and the HDTV signals are simulcast from the television transmitter facility.

6 Claims, 1 Drawing Sheet

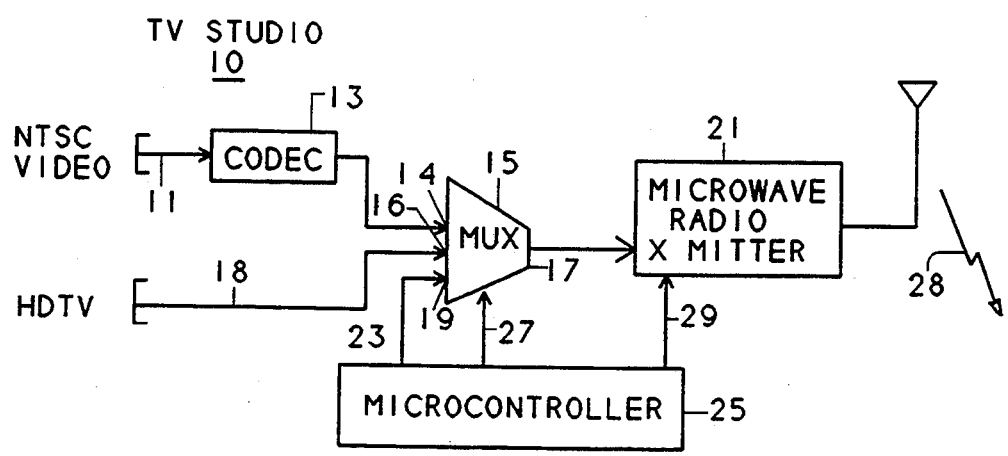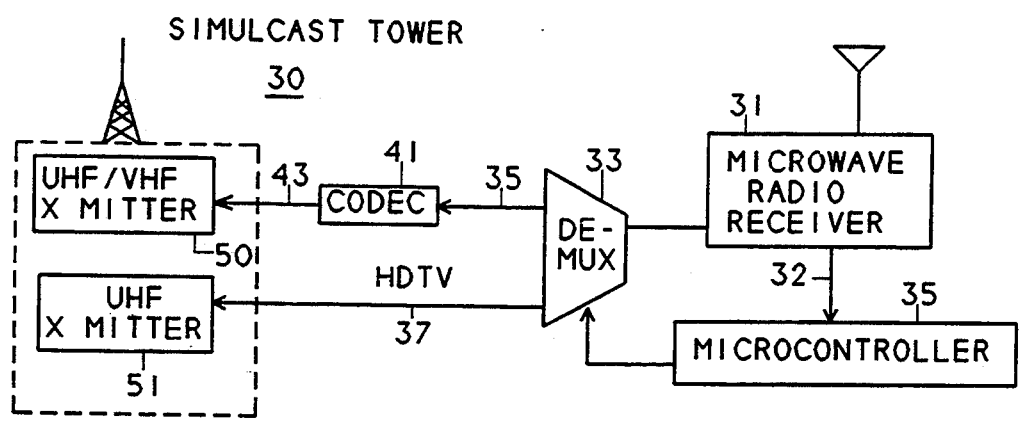

MULTIPLEXING OF DIGITALLY ENCODED NTSC AND HDTV SIGNALS OVER SINGLE MICROWAVE COMMUNICATION LINK FROM TELEVISION STUDIO TO TOWER TRANSMITTER FACILITY FOR SIMULTANEOUS BROADCAST (SIMULCAST) TO CUSTOMER SITES BY TRANSMITTER FACILITY

FIELD OF THE INVENTION

The present invention relates in general to television broadcasting systems and is particularly directed to a communication bandwidth conservation mechanism for conveying both NTSC and HDTV channels over a single microwave communication link between a television broadcasting studio sourcing the NTSC and HDTV signals and a broadcast transmission facility (tower) from which the respective television signals are broadcast for reception by customer sites.

BACKGROUND OF THE INVENTION

Television broadcast studios currently employ an FCC (Federal Communications Commission)-established standard, NTSC-signalling format for the broadcast of television programming to customer sites. Because the transmission facility (typically a microwave transmission tower) from which the television signals are broadcast (via VHF and/or UHF channels) over a prescribed customer service area is customarily located off-campus from the television studio, a dedicated (microwave) radio link is provided between the television studio and the tower, so that the NTSC-formatted television programming may be forwarded from the studio to the tower for broadcast. In some circumstances, an auxiliary return channel from the tower to the television studio, which is coupled to a satellite downlink at the tower facility, may also be provided.

With the advent of and continued industry impetus, as well as expected consumer demand, for high definition television (HDTV), the FCC has begun promulgating rules that will provide an introductory period for the simulcasting (simultaneous broadcasting) of HDTV and NTSC-based programming (which may include separate programs for each format), with an eventual phase-out replacement of the NTSC standard by an HDTV standard (broadcast on UHF channels), exclusively. Discussions between the FCC and the television broadcast industry as to how to accommodate this dual requirement of NTSC and HDTV signalling have included a consideration of allocating additional (currently reserved) bandwidth to the microwave link employed for the transmission of HDTV channels from the television studio to the tower. Because bandwidth conservation is a high FCC priority, and the time and expense of adding additional channel capability equipment for only a limited change-over interval are major concerns of television broadcasting service providers, the allocation of previously reserved bandwidth from the regulated communication spectrum is considered to be a less than ideal way to solve the problem. (The FCC has now made the decision not to allocate additional frequency spectrum for the studio-to-tower microwave link or for tower-to-studio microwave transmissions, even though there are two television signals to be transmitted.)

SUMMARY OF THE INVENTION

In accordance with the present invention, rather than allocate additional bandwidth dedicated to the transmission of HDTV signals from the studio to the tower, only a single (the currently employed) channel is used to convey both NTSC and HDTV signals between the television studio and the transmission tower facility. For this purpose, at the television studio, the analog NTSC signals are converted (via a codec) into the same digital format as HDTV signals, and the two sets of digitally encoded signals are then multiplexed together into a single digitally formatted channel. This single digital channel is applied to a digital microwave radio, which transmits the combined digital NTSC/HDTV channel over the microwave communication link currently employed for NTSC transmissions from the television studio to the tower.

At the tower, the output of a digital microwave radio receiver is demultiplexed into separate HDTV and NTSC digital paths. The NTSC signal is applied to a codec, which recovers the original analog format of the studio-sourced NTSC signals, so that they may be broadcast via (VHF/UHF) channels. Similarly, the HDTV signals are coupled to a UHF transmitter, thereby providing the required simulcast capability.

Advantageously, in addition to the capability of servicing both NTSC and HDTV signals on a common microwave communications channel, because of the digitally multiplexed format of the combined signals, and depending upon the encoding resolution employed, the present invention is also capable of accommodating both an outgoing, television studio-to-tower link (STL) and a return, tower-to-studio (TSL) link within separate bandwidth portions of the same channel.

BRIEF DESCRIPTION OF THE DRAWINGS

The single Figure is a diagrammatic illustration of a microwave communication system linking a television broadcast studio and a VHF/UHF transmission tower, which embodies a bandwidth conservation mechanism according to the present invention for conveying digitally encoded NTSC and HDTV signals over a single microwave communication link between the studio and the tower.

DETAILED DESCRIPTION

Before describing in detail the particular bandwidth conservation mechanism for multiplexing digitally encoded NTSC/HDTV signals over a single television studio-to-transmission tower microwave communication link in accordance with the present invention, it should be observed that the present invention resides primarily in a novel structural combination of conventional communication and signal processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

As pointed out briefly above, proposals put forth during discussions between the FCC and the television broadcast industry as to how to enable television broadcasting service providers to forward both NTSC and HDTV channels to an attendant transmission (tower) facility for broadcast on VHF/UHF channels to a customer service area have addressed allocating additional (currently reserved) bandwidth to the studio/tower link. Unfortunately, because of the importance of bandwidth conservation and the time and expense of adding additional channel capability equipment for only a limited change-over interval, the allocation of previously reserved bandwidth from the regulated communication spectrum is considered to be a less than ideal solution. (As pointed out above, the FCC has made the decision not to allocate additional frequency spectrum for the studio-to-tower microwave link or for tower-to-studio microwave transmissions, even though there are two television signals to be transmitted.)

In accordance with the present invention, a diagrammatic illustration of which is shown in the single Figure, rather than allocate additional bandwidth dedicated to HDTV signals, only a single (the currently employed) microwave channel is used to convey both NTSC and HDTV signals between the television studio and the transmission tower facility. For this purpose, at the television studio, shown at 10, rather than directly transmitting analog NTSC video signals over a dedicated link, the NTSC (analog) signals are applied via a link 11 to a codec 13, which converts the original analog NTSC video signals into a compressed digital format (which may have a data rate range on the order of from 12–45 MB/s, with 20 MB/s being a typical, non-limitative example). The digitally encoded NTSC signals are coupled as a first input 14 of a digital multiplexer 15, having an output 17 coupled to a digital channel microwave radio transmitter 21.

Multiplexer 15 has a second input 16, which is coupled to receive an HDTV-formatted digital bit stream (which may have a data rate on the order of 25 MB/s, for example) supplied over a link 18, and a third input 19 coupled over link 23, from an attendant microcontroller 25, which controls the operation of the digital multiplexing and transmission equipment in a customary fashion for digital signal processing applications. Link 23 is employed by microcontroller 25 to supply a framing pattern, to be recovered at the tower site for enabling controlled demultiplexing of the two digital channels, as conventionally effected in digital communications. The channel switching operation of multiplexer 15 is controlled via select input line 27, as directed by microcontroller 25 in accordance with respective data rates of the NTSC and HDTV channels.

Digital microwave radio transmitter 21, to which the output of multiplexer 15 is coupled and which is coupled to microcontroller 25 by way of link 29, is operative transmit the digitally multiplexed NTSC/HDTV channel over a single microwave radio frequency communication link 28 currently employed for NTSC transmissions from the television studio 10 to an attendant transmission tower 30. At the tower, the received signals are demodulated by a digital microwave radio receiver 31 and coupled to a demultiplexer 33. In accordance with conventional digital signal processing techniques, an attendant microcontroller 35, which is coupled to microwave radio receiver 31 by way of link 32, uses the recovered clock and framing signals embedded in the incoming combined digital channel signals to control the operation of demultiplexer 33, so as to separate out the respective HDTV and NTSC components into output paths 35 and 37. The NTSC signal in path 35 is applied to a codec 41, which recovers the original analog format of the studio-sourced NTSC signals on output link 43 to a UHF/VHF transmitter 50, so that they may be broadcast over (VHF/UHF) channels by transmission tower 30. Similarly, the HDTV signals on path 37 are coupled via link 45 to a digitally driven UHF transmitter unit 51 for broadcast by tower 30.

As noted earlier, in addition to the capability of servicing both NTSC and HDTV signals on a common digital signalling channel, because of the digitally multiplexed format of the combined NTSC/HDTV signals, and depending upon the encoding resolutions employed for the respective NTSC and HDTV channels, the multiplexing mechanism of the present invention is also capable of accommodating both an outgoing, television studio-to-tower link (STL) and a return, tower-to-studio (TSL) link within separate bandwidth portions of the channel 28. Namely, where the combined data rates of codec 13 and the HDTV channel 18 occupy only a portion of the bandwidth of channel 28, the remaining portion of channel 28 may be used to accommodate a return link from the transmitter site 30. In other words, the digital multiplexing scheme of the present invention not only makes it unnecessary to allocated additional frequencies for television studio-transmission tower signalling, but makes it possible to practically conserve and expand the capability of what is currently allotted.

As will be appreciated from the foregoing description, rather than allocate additional bandwidth dedicated to HDTV signals, in accordance with the new and improved television studio-transmission tower microwave communication mechanism of the present invention, only a single microwave channel is used to convey both NTSC and HDTV signals between the television studio and the transmission tower facility, thereby providing simulcast capability, without additional bandwidth overhead.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of transmitting NTSC video signals and digital HDTV signals, from a television studio sourcing each of said NTSC video and digital HDTV signals, over a common microwave communication channel to a television transmitter facility for broadcast therefrom to customer sites comprising the steps of:
   (a) at said television studio, converting said NTSC video signals into digital format;
   (b) multiplexing digitally formatted NTSC signals obtained in step (a) and said digital HDTV signals into a combined NTSC/HDTV digital television signal; and
   (c) transmitting the combined NTSC/HDTV digital television signal obtained in step (b) over a first sub-portion of the bandwidth of said common microwave communications channel linking said television studio with said television transmitter facility, so as to make a remaining sub-portion of the bandwidth of said common microwave communication channel linking said television studio with said television transmitter facility available for use as a return transmission link from said television transmitter facility to said television studio.

2. An arrangement for transmitting NTSC video signals and digital HDTV signals, from a television studio sourcing each of said NTSC video and digital HDTV signals, over a common microwave communication channel to a television transmitter facility for broadcast therefrom to customer sites, comprising, at said television studio, a digital codec which is operative to convert said NTSC video signals in to digital format, a multiplexer which is operative to multiplex digitally formatted NTSC produced by said codec with said digital HDTV signals into a combined NTSC/HDTV digital television signal, and a transmitter, coupled to the output of said multiplexer and being operative to transmit the combined NTSC/HDTV digital television signal over said common microwave communication channel linking said television studio with said television transmitter facility; and wherein the transmitter at said television studio is operative to transmit the combined NTSC/HDTV digital television signal over a first sub-portion of the bandwidth of said common microwave communication channel linking said television studio with said television transmitter facility, so as to make a remaining sub-portion of the bandwidth of said common microwave communication channel linking said television studio with said television transmitter facility available for use as a return transmission link from said television transmitter facility to said television studio.

3. A method of simulcasting from a television transmitter facility each of NTSC video signals, via a UHF/VHF portion of the broadcast spectrum, and digital HDTV signals, over a prescribed UHF portion of the broadcast spectrum, comprising the steps of:
(a) at a television studio, which sources NTSC video signals to be broadcast by said television transmitter facility, converting said NTSC video signals into digital format;
(b) multiplexing digitally formatted NTSC signals obtained in step (a) and said digital HDTV signals into a combined NTSC/HDTV digital television signal;
(c) transmitting the combined NTSC/HDTV digital television signal obtained in step (b) over a first sub-portion of the available bandwidth of said common microwave communication channel linking said television studio with said television transmitter facility, so as to make a remaining sub-portion of the bandwidth of said common microwave communication channel linking said television studio with said television transmitter facility available for use as a return transmission link from said television transmitter facility to said television studio;
(d) at said television transmitter facility, demultiplexing said combined NTSC/HDTV digital television signal into separate HDTV and NTSC digital paths;
(e) converting digital NTSC video signals, demultiplexed in step (c) into said NTSC digital path, into analog NTSC format; and
(f) simulcasting, from said television transmitter facility, each of the NTSC video signals obtained in step (c) and said HDTV signals.

4. A method of transmitting first and second respectively different types of television signals from a television studio over a common microwave communication channel to a television transmitter facility for broadcast therefrom to customer sites comprising the steps of:
(a) at said television studio, multiplexing said first and second respectively different types of television signals into a combined television signal; and
(b) transmitting the combined television signal obtained in step (a) over a first sub-portion of the bandwidth of said common microwave communications channel linking said television studio with said television transmitter facility, so as to make a remaining sub-portion of the bandwidth of said common microwave communication channel linking said television studio with said television transmitter facility available for use as a return transmission link from said television transmitter facility to said television studio.

5. An arrangement for transmitting first and second respectively different types of television signals from a television studio over a common microwave communication channel to a television transmitter facility for broadcast therefrom to customer sites, comprising, at said television studio, a multiplexer which is operative to multiplex said first and second respectively different types of television signals into a combined television signal, and a transmitter, coupled to the output of said multiplexer and being operative to transmit said combined television signal over first sub-portion of the bandwidth of said common microwave communication channel linking said television studio with said television transmitter facility, so as to make a remaining sub-portion of the bandwidth of said common microwave communication channel linking said television studio with said television transmitter facility available for use as a return transmission link from said television transmitter facility to said television studio.

6. A method of simulcasting from a television transmitter facility each of first and second respectively different types of television signals over a prescribed portion of the broadcast spectrum, comprising the steps of:
(a) at a television studio, which sources said first and second respectively different types of television signals to be broadcast by said television transmitter facility, multiplexing said first and second respectively different types of television signals into a combined television signal;
(b) transmitting the combined television signal obtained in step (a) over a first sub-portion of the available bandwidth of said common microwave communication channel linking said television studio with said television transmitter facility, so as to make a remaining sub-portion of the bandwidth of said common microwave communication channel linking said television studio with said television transmitter facility available for use as a return transmission link from said television transmitter facility to said television studio;
(c) at said television transmitter facility, demultiplexing said combined television signal into said separate first and second respectively different types of television signals; and
(d) simulcasting, from said television transmitter facility, each of said first and second respectively different types of television signals.

* * * * *